United States Patent [19]

Kohmoto

[11] Patent Number: 5,034,762
[45] Date of Patent: Jul. 23, 1991

[54] LIGHT INTERCEPTION DEVICE

[75] Inventor: Shinsuke Kohmoto, Tokyo, Japan

[73] Assignee: Asahi Kogaku Kogyo Kabushiki Kaisha, Tokyo, Japan

[21] Appl. No.: 354,238

[22] Filed: May 19, 1989

[30] Foreign Application Priority Data

May 20, 1988 [JP] Japan .............................. 63-66570[U]

[51] Int. Cl.⁵ .............................................. G03B 1/18
[52] U.S. Cl. ................................. 354/195.12; 354/288
[58] Field of Search ................. 354/195.1, 288, 195.12

[56] References Cited

U.S. PATENT DOCUMENTS 4,721,972 1/1988 Wakabayashi .................. 354/288 X

FOREIGN PATENT DOCUMENTS 63-30837 2/1988 Japan .
8707038 11/1987 PCT Int'l Appl. .

Primary Examiner—Brian W. Brown
Attorney, Agent, or Firm—Sandler, Greenblum, & Bernstein

[57] ABSTRACT

A camera has a front cover with an inner wall and an opening for a movable lens barrel. An immovable annular member is spaced from the inner wall of the front cover. A light interception member, with elastic end projections and inner lips, is disposed in the space between the inner wall of the front cover and the annular member. The end projections of the light interception member contact the inner wall of the front cover and inner lips are in slidable contact with the movable lens barrel.

12 Claims, 6 Drawing Sheets

LIGHT INTERCEPTION DEVICE

BACKGROUND OF THE INVENTION

1. Field of the Invention

The present invention relates to a lens keeping type camera, and especially to a light interception device for shutting out harmful light which can enter the camera at the front of a movable lens barrel of the camera.

2. Description of the Related Art

The assignee of the applicants has already proposed a light interception device in which, in a lens shutter type camera wherein a zoom operation is carried out by moving at least two groups of front and rear lenses independently along the optical axis thereof, harmful light is prevented from entering the lens system from outside of the movable lens barrels through a gap formed between the movable lens barrels supporting the two groups of front and rear lenses (U.S. Ser. No. 144,030, Japanese Unexamined Utility Model Publication No. 63-30837). In this light interception device, the entrance of harmful light into the camera is prevented by providing an annular inteception member. The inner surface of the annular interception member, that forms the light interception device, is in slidable contact with an outer surface of a front movable lens barrel. This type of light interception device however, has a defect in that, when the movable lens barrel is moved forward, the annular interception member comes into direct contact with an inner wall of a front cover that has an opening for the movable lens barrel, whereupon a noise or shock due to that contact is heard or felt by the camera user. The noise or shock distracts the user when taking photographs.

SUMMARY OF THE INVENTION

Therefore, the object of the present invention is to provide a light interception device that prevents harmful light from entering a lens system from outside of a front movable lens barrel of any lens shutter type camera, and a noise or shock due to a contact between the light interception member and the front cover is eliminated.

The light interception device of the present invention comprises an annular light interception member provided in the annular space formed between an outer peripheral inner wall of an opening of a front cover and an immovable annular member located on the inner side of the cover. The annular interception member is provided with an inner peripheral lip in elastic contact with an outer surface of the movable lens, and with end projections in elastic contact with at least one of the front cover and the immovable annular member.

The harmful light referred to herein is light which does not enter through a taking lens to reach the film and results in a decreased contrast of an image and in a decreased quality of a color film.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 6:
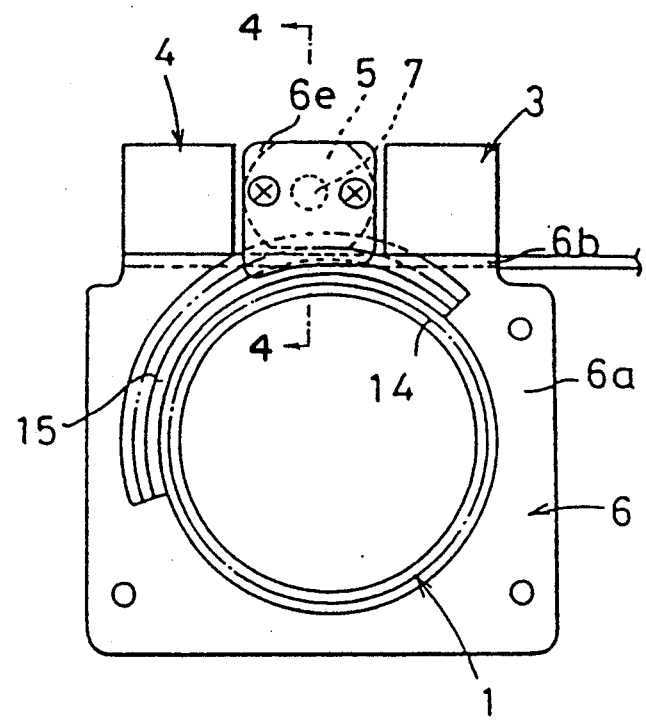
FIG. 6 is a front elevational view of a base fixed on a camera body.
Figure 7:
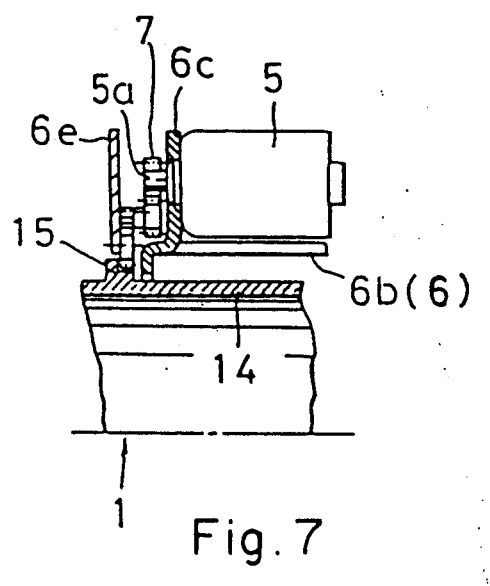
FIG. 7 is a sectional view taken along a line IV—IV of FIG. 6.
Figure 8:
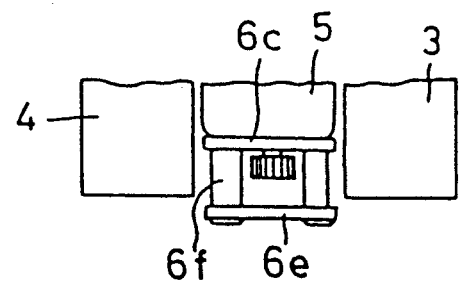
FIG. 8 is a plane view of FIG. 6.

The present invention will now be described below with reference to an embodiment shown in the drawings. A lens shutter type camera in an embodiment of the present invention comprises a zoom lens barrel block 1, a finder and strobe block 2, a light emitter 3 and a light receiver 4 forming a part of a distance measuring device (an AF device), and a zooming motor 5 used for the zooming operation of the photographing optical system. All of these elements are secured to a base 6 (refer to FIGS. 6 through 8) which forms an immovable portion of the camera body.

The base 6 includes a lens barrel support plate 6a which lies in a plane perpendicular to the optical axis of the lens, a horizontal support plate 6b extending at a right angle from a top end of the lens barrel support plate 6a, and motor support plates 6c positioned perpendicularly with respect to the horizontal support plate 6b. The lens barrel block 1 is supported by the lens barrel support plate 6a. A zooming motor 5 is attached to the motor support plates 6c and is located above the central portion of lens barrel block 1, and the light emitter 3 and the light receiver 4 secured to the horizontal support plate 6b are located on opposite sides of the zooming motor 5. The finder and strobe block 2 are secured to the right hand portion of horizontal support plate 6b shown ion FIG. 6, and a gear train support plate 6e is connected to the motor support plates 6c via a spacer 6f.

Figure 1:
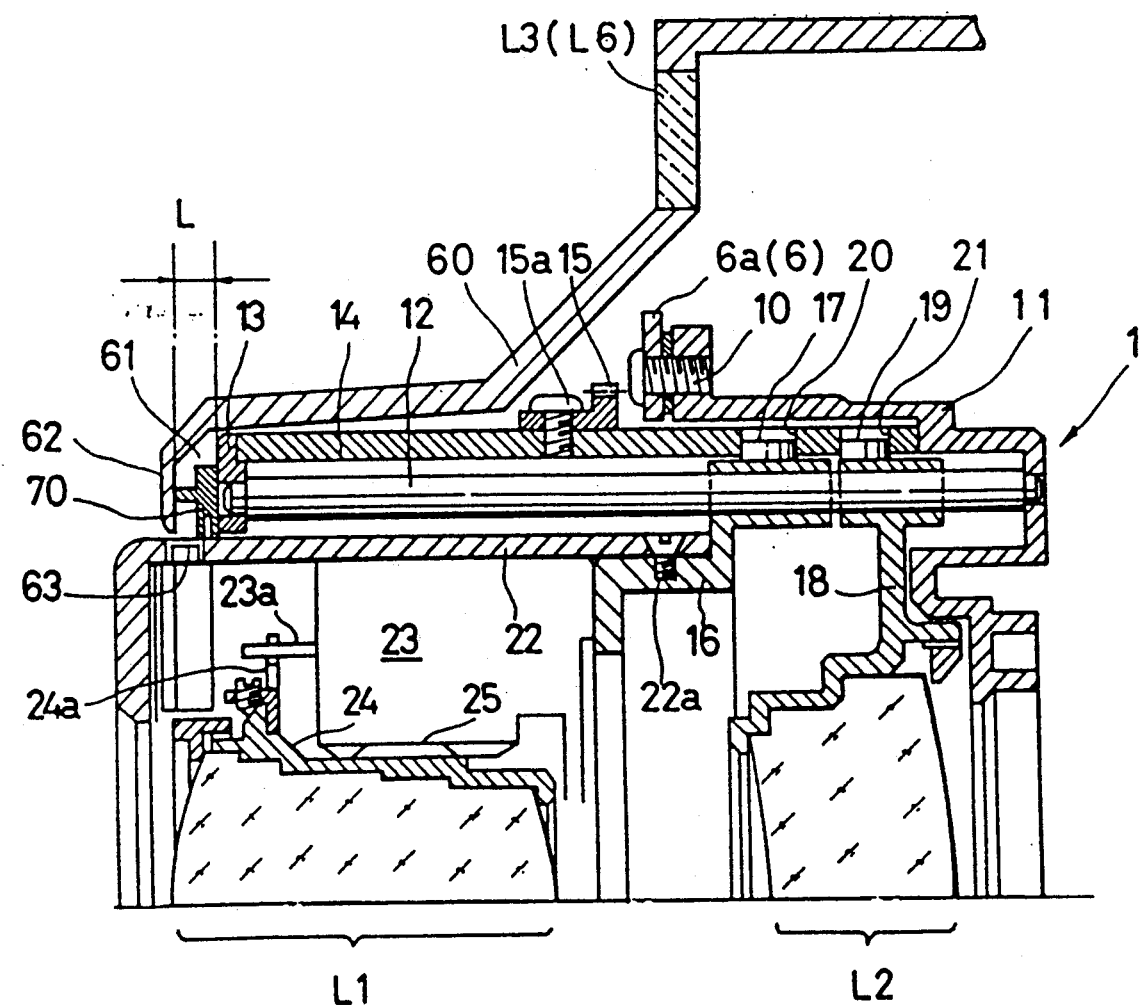
FIG. 1 is a longitudinal sectional view of an embodiment of a light interception device of the present invention.
Figure 10:
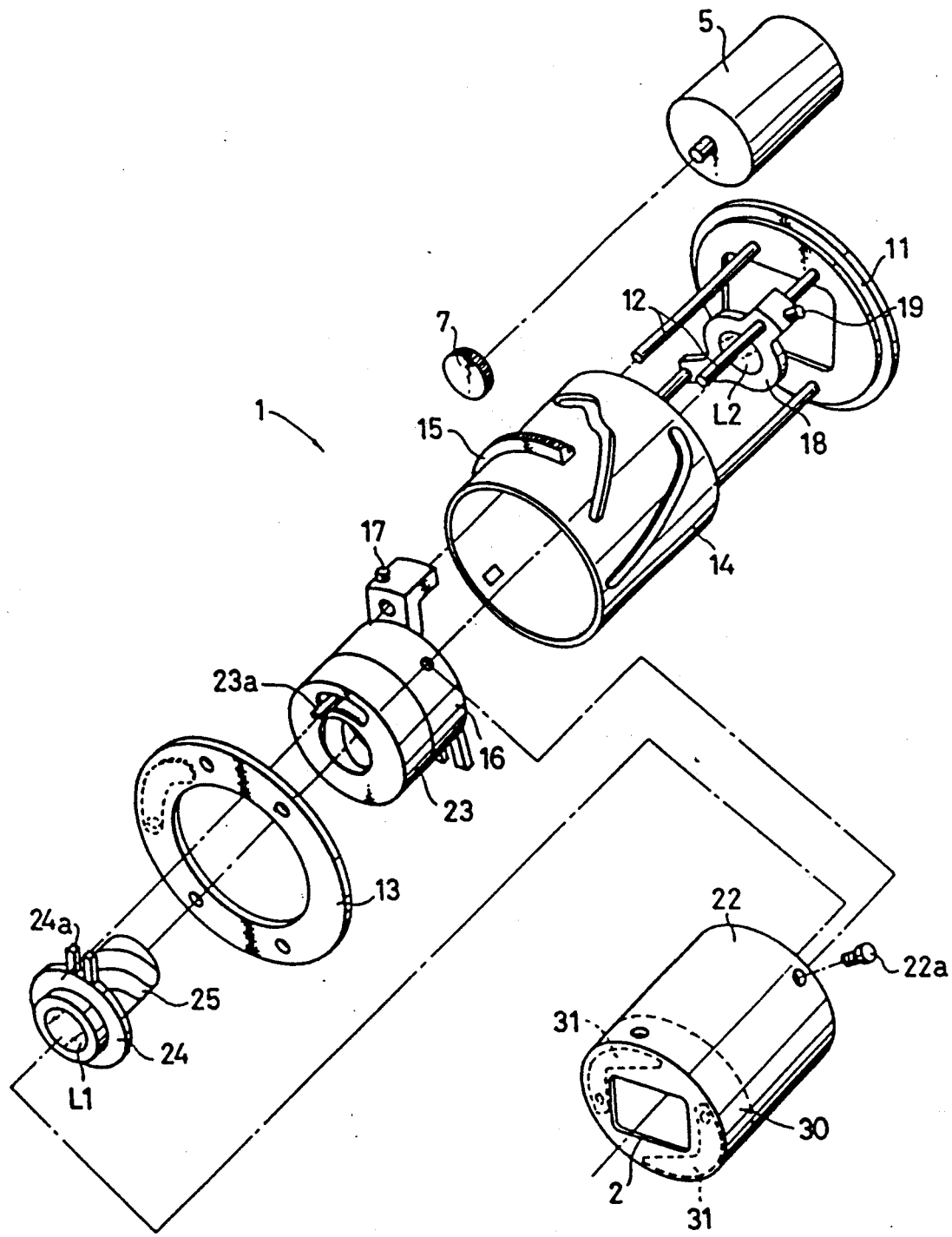
FIG. 10 is an exploded perspective view of a main part of the lens shutter type camera.

The lens barrel block 1 is actuated by the zooming motor 5, and has a construction as shown in FIGS. 1 and 10. The lens barrel block 1 can carry out zooming operation and macrophotography operation. A rear securing plate 11 is mounted to the lens barrel support plate 6a of the base 6 by fastening screws 10. Four guide rods 12 are fixed to the rear securing plate 11, and are located about and in parallel to the optical axis of the photographing optical system, and a front securing plate 13 is secured to the front ends of the guide rods 12. The above are the main elements for securing the lens barrel block 1.

A cam ring 14 is rotatably supported between the rear securing plate 11 and the front securing plate 13, and a sector gear 15 able to be directly or indirectly engaged with a pinion 7 is provided at the outer periphery of cam ring 14, via set screws 15a (FIG. 1). This gear 15 can be a sector gear which will cover a predetermined range of rotational movement of the cam ring 14. The cam ring 14 is also provided with zooming cam grooves 20 and 21 which are engaged with the front and rear lens element groups, respectively.

Figure 9:
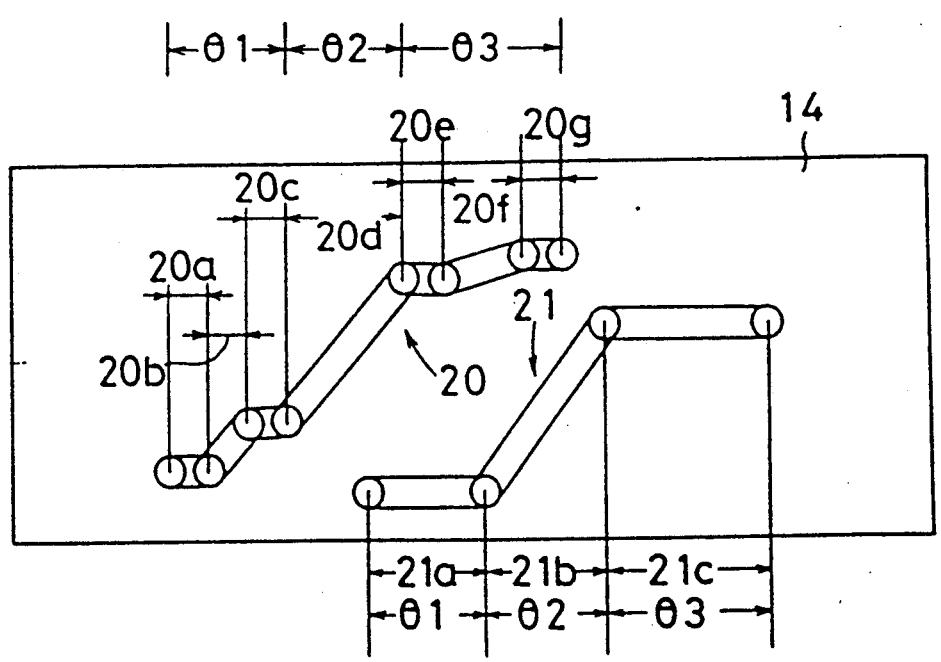
FIG. 9 is a developed view of cam grooves.

FIG. 9 is a schematic or developed view of the zooming cam grooves 20 and 21. The zooming cam groove 21, which engages the rear lens element group, includes an extreme wide angle fixing section 21a, a variable magnification section 21b, and an extreme telephoto fixing section 21c. The zooming cam groove 20, used for the front lens element group, includes a section 20a for opening and closing a barrier block 30, a lens retraction section 20b, an extreme wide angle fixing section 20c, a variable magnification section 20d, an extreme telephoto fixing section 20e, a macro transfer section 20f, and an extreme macro fixing section 20g.

The total angle $\theta_1$ of the rotational displacement of the cam ring opening and closing section 20a, the lens retraction section 20b, and the extreme wide angle fixing section 20c of the zooming cam groove 20 is identical to an angle $\theta_1$ of the extreme wide angle fixing section 21a of the zooming cam groove 21, and an angle $\theta_2$ of the variable magnification section 20d of the zooming cam groove 20 is identical to an angle $\theta_2$ of the variable magnification section 21b of the zooming cam groove 21. Further, the total angle $\theta_3$ of the extreme telephoto fixing section 20e, the macro transfer section 20f, and the macro position fixing section 20g is equal to the angle $\theta_3$ of the extreme telephoto fixing section 21c. The barrier block 30 is made to open and close a pair of barriers 31 by a rotation of the opening and closing section 20a of the cam ring 14.

A roller 17 is positioned within the zooming cam groove 20 and attached to the front lens group frame 16 movably guided by the guide rods 12, and a roller 19 is positioned within zooming cam groove 21 and attached to the rear lens group frame 18 movably guided by the guide rods 12. A decorative frame 22, which is a part of the front lens group frame 16, and a shutter block 23 are secured to the front lens group frame 16 via set screws 22a.

A front lens frame 24, which supports a front lens element group L1, is threadingly engaged with the shutter block 23 through a helicoid 25, and includes an arm 24a which engages a lens feed lever 23a of the shutter block 23. Therefore, when the lens feed lever 23a is rotated in a circumferential direction, so that the front lens frame 24 is rotated, the front lens frame 24 moves along the direction of the optical axis of the photographing optical system under the guidance of the helicoid 25. A rear lens element group L2 is directly attached to the rear lens group frame 18.

The structure of the shutter block 23 is known per se, and this shutter block 23 is operated by a pulse motor incorporated therein to rotate the lens feeding lever 23a over a predetermined angular displacement in accordance with a detection signal received by the shutter block 23 from the distance measuring device having the light emitter 3 and the light receiver 4, to open the closed shutter sector 23b, for a predetermined time, and again close the shutter sector 23b, and to then return the lens feed lever 23a to the original position thereof.

As clearly understood from the above described construction, the front lens group frame 16 (the decorative frame 22) and the rear lens group frame 18 are moved relative to each other, and thus a space is formed therebetween. Therefore, light passing through the outside of the decorative frame 22 can enter the lens system through that space, and the film in the camera body will be exposed to harmful (unwanted) light.

To shut out this harmful light, there is provided an annular space 61 for inserting a light interception member, between the front securing plate 13 rotatably supporting the front portion of the cam ring 14 and the front cover 60 (FIGS. 1 and 4), and the light interception member 70 is inserted in the annular space 61. The front cover 60 covers the front face of the lens barrel block 1 and supports the lenses L3 and L6 of the finder and strobe block 2. An opening 63 for the decorative frame 22 (the front lens group frame 16) is provided inside an inner flange 62 formed at the front end of the front cover 60. The annular space 61 formed between the inner flange 62 and the front securing plate 13 has a width sufficient to allow the insertion of the annular light interception member 70.

Figure 2:
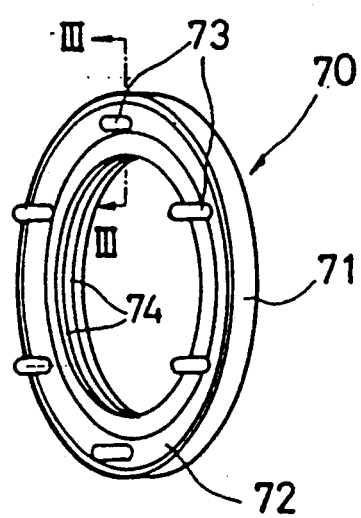
FIG. 2 is a perspective view of an example of an annular light interception member.
Figure 3:
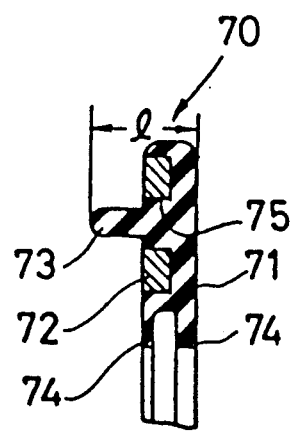
FIG. 3 is a sectional view taken along line III—III of FIG. 2.
Figure 4:
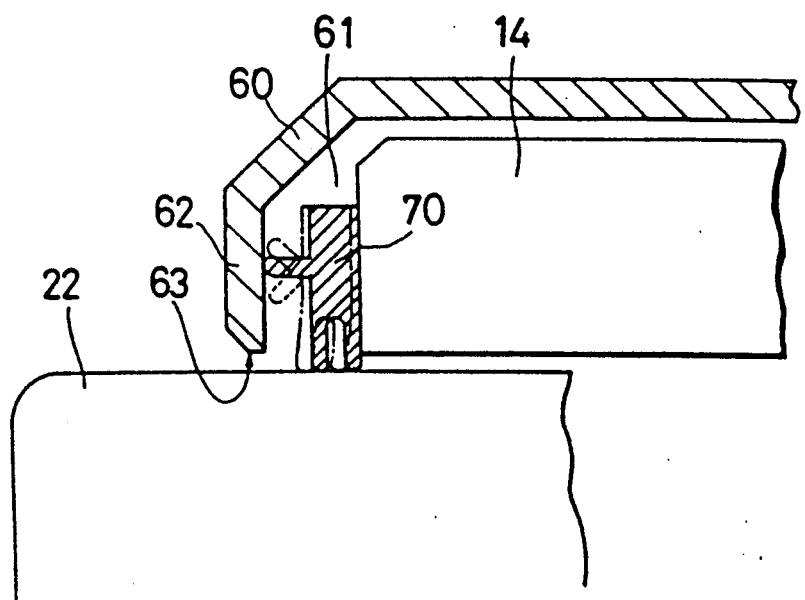
FIG. 4 is a schematic sectional view on an enlarged scale of a main part of FIG. 1.

The annular light interception member 70 inserted in the annular space 61 includes an elastic annular body 71 made of a rubber or the like, and an annular reinforcing plate 72, as shown in detail in FIGS. 2 and 3. The annular light interception member 70 has a flat ring shape, and inner lips 74 and end projections 73 are integrally formed on the elastic annular body 71. The annular reinforcing plate 72 is fixed to the elastic annular body 71 in such a manner that base portions of the end projections 73 are fitted in a connection hole 75 formed on the annular reinforcing plate 72. This annular reinforcing plate 72 is made of metal or synthetic resin or the like. A plurality of the end projections 73 are provided on the same circle at regular intervals, and are elastically deformed when engaged with the inner wall of the inner flange 62 (FIG. 4).

The other end projections 73 may be brought into elastic contact with the inner wall of the front securing plate 13. The end projections 73 may be formed in the shape of a ring.

The inner lips 74 are formed on the inner part of the annular reinforcing plate 72 integrally with the elastic annular body 71 and in the shape of thin plates, to come into elastic contact with the outer surface of the decorative frame 22. Although two inner lips 74 are provided to ensure that harmful light cannot enter the lens system, in the embodiment shown in the drawings, the same object can be realized by one inner lip formed on the central part of the inner surface of the body 71.

In the annular light interception member 70, the thickness l obtained by adding the thickness of the member 70 to the height of the end projection 73 is equal to or slightly larger than the breadth L of the annular space 61, so that the annular light interception member 70 is in elastic contact with both the inner wall of the inner flange 62 and the front securing plate 13. The annular light interception member 70 is able to move slightly in the annular space 61 along the optical axis, of the camera optical system, due to an elastic deformation of the end projections 73.

In the camera having the above described structure, when the zooming motor 5 is driven, the cam ring 14 is rotated, and the front lens group frame 16 and the rear lens group frame 18 are moved along the optical axis of the camera optical system in accordance with the zooming cam grooves 20, 21, to provide a zooming operation or macrophotography. This movement of the front lens group frame 16 along the optical axis of the camera optical system causes the decorative frame 22 forming a part of the front lens group frame 16 to move forward and backward through the opening 63 of the front cover 60.

At this time, the inner lips 74 of the annular light interception member 70 are in slidable contact with the outer surface of the decorative frame 22 to shut out harmful light entering from the outside of the decorative frame 22. The end projections 73 are pressed against the inner surface of the inner flange 62 and elastically deformed either outward or inward in the radial direction of the annular light interception member 70, as shown by chain lines in FIG. 4, so that the annular reinforcing plate 72 does not come into contact with the inner flange 62, and thus a noise or shock caused by a contact between the annular reinforcing plate 72 and the inner flange 62 is prevented. When the direction of movement of the decorative frame 22 is changed, since the end projections 73 are elastically returned to their original positions and the inner lips 74 are deformed in accordance with this deformation of the end projections 73, the annular light interception member 70 shuts out harmful light regardless of the direction of movement of the decorative frame 22.

Note that harmful light can be prevented from entering through the zooming cam grooves 20, 21 of the cam ring 14 by, for example, applying a light interception tape to the outside of the zooming cam grooves 20, 21, but the present invention is not related to such a light interception means.

Figure 5:
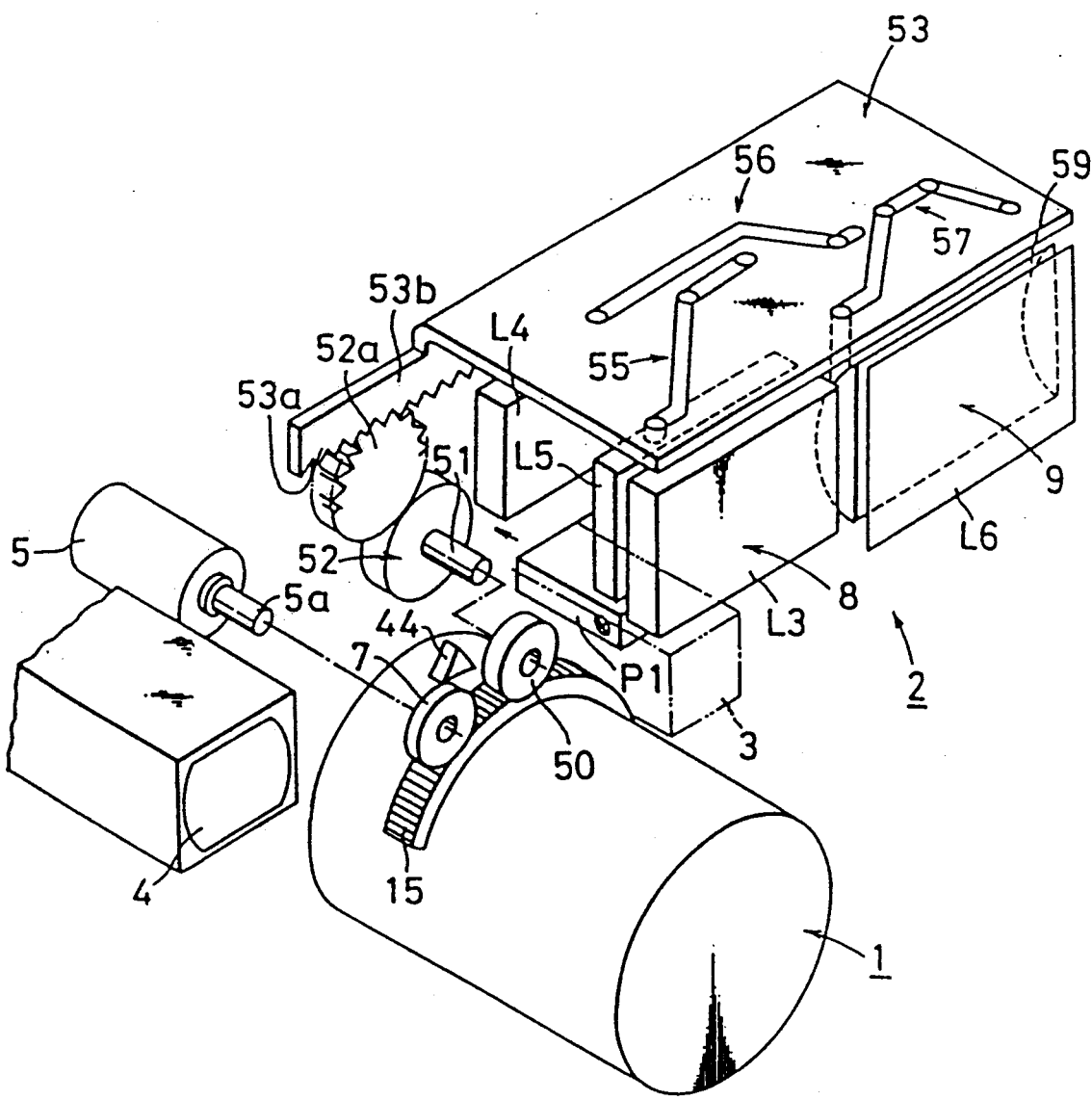
FIG. 5 is a schematic perspective view showing a complete view of a lens shutter type camera to which the present invention is applied.

Finally, a finder assembly 8 and a strobe assembly 9 of the finder block 2 shown in FIG. 5 are described briefly. The finder assembly 8 and the strobe assembly 9 are used to vary, respectively, the field of view of the finder and the illumination angle (i.e., the intensity of the strobe light), in accordance with variations in the focal length of the lens barrel block 1. The zooming motor 5 is used as a power source for both the finder control and the strobe control.

The section gear 15 of the cam ring 14 is engaged with another pinion 50 different from the pinion 7 referred to previously. The shaft 51 to which the pinion 50 is attached extends rearwardly towards the rear portion of base 6, and is provided with a reduction gear train 52 adjacent to a rear end of the shaft 51. The reduction gear train 52 includes a final gear 52a in mesh with a rack 53a of a movable cam plate 53. This cam plate 53 is able to slide to the right and to the left, and includes a downward bent portion 53b at the rear end thereof. A rack 53a is formed integrally on the lower end of its bent portion 53b. The reduction gear train 52 is able to reduce a rotation of the gear 15 so that the movement of the cam ring 14 is reduced and transmitted to the cam plate 53. The cam plate 53 is provided with a variable power cam groove 55 for guiding the movement of the finder assembly 8, a parallax correction cam groove 56, and a strobe cam groove 57 for guiding the movement of the strobe assembly 9.

The lens system used in the finder optical assembly 8 essentially comprises a subject lens group L3, an eyepiece group L4, and a movable variable power lens group L5, and further comprises a deflection prism P1 used when the camera is in the macro or close-up mode. The variable power lens group L5 coincides the image picture size, which is varied in accordance with variations in the power operation of the lens barrel block 1, with the field of view in the finder assembly 8. The deflection prism P1 enters the optical path of the finder lens system only in the macro mode, to adjust a parallax which otherwise occurs in this mode. Specifically, a parallax which unavoidably occurs when using a lens-shutter type cameras will increase as the camera approaches the subject of the picture to be taken, and accordingly, a large parallax would normally occur in the macro mode. To solve this problem and to reduce the large parallax which otherwise occurs in the macro mode, the deflection prism P1 is provided in the form of a wedge having a thick lower end and a thin upper end. The deflection prism P1, when located along the optical axis of the finder optical system, serves to deflect rays downward, to enable a picture to be taken of a subject located extremely close to the camera.

Although the above described embodiment is related to a construction in which the movable lens barrel for a zooming operation is divided into two parts, i.e., front and rear parts, the present invention can be applied to a construction in which a movable lens barrel for a focusing operation is divided into a plurality of parts.

Further, although the embodiments of the present invention have been described herein with reference to the accompanying drawings, obviously many modifications and changes may be made by those skilled in this art without departing from the scope of the invention.

I claim:

1. A light interception device for use in a camera having a rotatable cam ring, a movable lens barrel moving along an optical axis of the camera optical system in accordance with the rotation of the cam ring, a front cover including an opening through which the movable lens barrel moves, and an annular space formed between an inner wall positioned at an outer periphery of the opening of the front cover and an immovable annular member located at an inner side of the front cover, said light intercepting device comprising:
   an annular light interception member adapted to be inserted in the annular space,
   said annular light interception member including at least one inner lip adapted to be in elastic contact with an outer surface of the movable lens barrel, and at least one end projection protruding from an end surface of said annular light interception member and adapted to be in elastic contact with at least one of the front cover and the immovable annular member.

2. A light interception device according to claim 1, wherein the immovable annular member is a front securing plate rotatably supporting a front end of the cam ring.

3. A light interception device according to claim 1, wherein said annular light interception member comprises an annular elastic body formed integrally with said inner lip and said end projection, and an annular reinforcing plate positioned in said annular elastic body.

4. A light-interception device according to claim 1, wherein a plurality of said end projections are provided at intervals along a circle defined by said light interception member.

5. A light interception device according to claim 1, wherein said end projection comprises a ring.

6. A light interception device according to claim 1, wherein said inner lip comprises a ring, wherein a plurality of said inner lips are provided.

7. A light interception device of a camera, said camera comprising;
   a movable lens barrel moving along an optical axis of a camera optical system,
   a front cover having an opening through which said movable lens barrel moves, and
   an annular space formed between an inner wall positioned at an outer periphery of the opening of the front cover and an immovable annular member located at an inner side of the front cover said device comprising;

an annular light interception member adapted to be inserted in the annular space and adapted for sliding contact with the movable lens barrel, the thickness of said annular light interception member being at least equal to the thickness along the optical axis of the annular space.

8. A light interception device according to claim 7, wherein said annular light interception member includes elastic portions located at positions where said annular light interception member is adapted to be in contact with the front cover and with the immovable annular member.

9. A light interception device according to claim 7, wherein said annular interception member comprises an elastic lip adapted to be in sliding contact with an outer surface of the movable lens barrel.

10. A light interception device according to claim 8, wherein at least one of said positions where said annular interception member is adapted to be in contact with the front cover and with the immovable annular member comprises an end projection protruding from an end surface of said annular light interception member.

11. A light interception device according to claim 10, wherein a plurality of said end projections are provided at intervals along a circle and defined by said light interception member.

12. A light interception device according to claim 7, wherein the thickness of said annular light interception member is slightly larger than the thickness along the optical axis of the annular space, so that the light interception member elastically contacts the inner side of the front cover.

* * * * *

UNITED STATES PATENT AND TRADEMARK OFFICE
CERTIFICATE OF CORRECTION

PATENT NO. : 5,034,762
DATED : July 23, 1991
INVENTOR(S) : S. KOHMOTO

It is certified that error appears in the above-indentified patent and that said Letters Patent is hereby corrected as shown below:

At column 1, line 7 change "keeping" to ---shutter---.
    At column 1, line 9 change "shutting" to ---keeping---.
    At column 1, line 28 insert ---,--- after "device".
    At column 2, line 52 change "macrophotography" to ---macrophotograph---.
    At column 7, line 2 (claim 7, line 10) insert ---:--- after "cover".

Signed and Sealed this

Fifth Day of September, 1995

BRUCE LEHMAN

Attest:

*Attesting Officer*      *Commissioner of Patents and Trademarks*